United States Patent
Itoh et al.

(10) Patent No.: US 8,258,728 B2
(45) Date of Patent: Sep. 4, 2012

(54) ROTARY ELECTRIC MACHINE CONTROL SYSTEM

(75) Inventors: Takeshi Itoh, Nagoya (JP); Hirofumi Kako, Kariya (JP)

(73) Assignee: Denso Corporation, Kariya (JP)

( * ) Notice: Subject to any disclaimer, the term of this patent is extended or adjusted under 35 U.S.C. 154(b) by 435 days.

(21) Appl. No.: 12/566,070

(22) Filed: Sep. 24, 2009

(65) Prior Publication Data

US 2010/0072927 A1    Mar. 25, 2010

(30) Foreign Application Priority Data

Sep. 24, 2008 (JP) ................................. 2008-243648

(51) Int. Cl.
*H02P 21/00* (2006.01)
(52) U.S. Cl. ............... 318/400.02; 318/432; 318/400.09
(58) Field of Classification Search ............ 318/400.07, 318/400.09, 400.15, 432, 434, 437, 804, 318/812, 400.01, 400.02, 400.14, 799; 180/65.265; 388/811
See application file for complete search history.

(56) References Cited

U.S. PATENT DOCUMENTS

| | | | |
|---|---|---|---|
| 7,199,540 B2 * | 4/2007 | Yaguchi | 318/432 |
| 7,828,093 B2 * | 11/2010 | Hanada et al. | 180/65.265 |
| 8,018,195 B2 * | 9/2011 | Ohtani et al. | 318/812 |

FOREIGN PATENT DOCUMENTS

| | | |
|---|---|---|
| EP | 1 950 878 | 7/2008 |
| JP | 2000-358393 | 12/2000 |
| JP | 2007-151336 | 6/2007 |
| JP | 2008-11682 | 1/2008 |
| WO | WO 2008/001524 | 1/2008 |

OTHER PUBLICATIONS

U.S. Appl. No. 12/566,049, filed Sep. 24, 2009, naming Takeshi Itoh et al, as inventors.
U.S. Appl. No. 12/566,107, filed Sep. 24, 2009, naming Takeshi Itoh et al, as inventors.

* cited by examiner

*Primary Examiner* — Walter Benson
*Assistant Examiner* — Antony M Paul
(74) *Attorney, Agent, or Firm* — Nixon & Vanderhye P.C.

(57) ABSTRACT

A control unit of a rotary electric machine control system includes a stationary switching module and a transitional switching module. The stationary switching module switches over a control mode from a rectangular wave voltage phase control mode to an overmodulation current control mode by using a current phase of a smoothed current produced by filtering of high harmonic components on an actual current in a stationary operation state. The transitional switching module switches the control mode from the rectangular wave voltage phase control mode to the overmodulation current control mode by using the current phase of the actual current in a transitional operation state. The control mode is switched over by comparing the current phase of the actual current with a transitional switching reference line, which is preset separately from a switching reference line used for comparison with a current phase of the smoothed current.

3 Claims, 6 Drawing Sheets

ROTARY ELECTRIC MACHINE CONTROL SYSTEM

CROSS REFERENCE TO RELATED APPLICATION

This application is based on and incorporates herein by reference Japanese patent application No. 2008-243648 filed on Sep. 24, 2008.

This patent application is related to co-pending U.S. patent applications arising from Japanese patent applications No. 2008-243633 filed on Sep. 24, 2008 (IPICS 122526-US-KK/mk) and No. 2008-243738 filed on Sep. 24, 2008 (IPICS 122524-US-KK-mik).

FIELD OF THE INVENTION

The present invention relates to a rotary electric machine control system and, more particularly, to a rotary electric machine control system, which switches over a control mode among a sinusoidal wave current control mode, an overmodulation current control mode and a rectangular wave voltage phase control mode.

BACKGROUND OF THE INVENTION

In driving a rotary electric machine by an inverter, a control mode is switched over among a sinusoidal wave current control mode, an overmodulation current control mode and a rectangular wave voltage phase control mode. The rectangular control mode, which uses one-pulse switching, is required to attain both high output power and size reduction of the rotary electric machine. The rotary electric machine is controlled optimally by switching over the control mode between the sinusoidal wave current control mode, which provides a superior characteristic in a low speed region, and the overmodulation current control mode, which is used in an intermediate speed region.

In the sinusoidal wave current control mode and the overmodulation current control mode, current feedback control is performed to output a pulse-width modulation (PWM) pattern to the rotary electric machine by comparing a command voltage and a carrier wave voltage. In the rectangular wave voltage phase control mode, torque feedback control is performed to output a one-pulse switching waveform to the rotary electric machine in accordance with an electric angle, while fixing an amplitude of voltage to a maximum value and controlling phase.

The switching from the sinusoidal wave current control mode to the overmodulation control mode, from the overmodulation current control mode to the rectangular wave voltage phase control mode is performed in accordance with a rate of modulation or an amplitude of a command voltage corresponding to the modulation rate. The switching from the rectangular wave voltage phase control mode to the overmodulation current control mode is performed by checking a switching time point in accordance with a phase of an actual current (instantaneous current) relative to a command current, because the amplitude of the command voltage is fixed in the rectangular wave voltage phase control mode.

According to an AC motor drive control system disclosed in the following patent document 1, a control mode is switched over from a PWM current control mode to an overmodulation control mode when an amplitude of a voltage exceeds 1.00 time of a peak value of a reference triangular wave voltage. The control mode is switched over to a rectangular wave voltage phase control mode when the amplitude of the voltage exceeds 1.27 times of the peak value of the reference triangular wave voltage. The control mode is switched over from the rectangular wave voltage phase control mode to the overmodulation current control mode when an absolute value of phase of an actual current decreases to be less than an absolute value of phase of a command current.

Low-pass filtering is performed on a measured current, because a d-axis current and a q-axis current include periodic noises and high harmonic components. Due to this filtering, the switching-over from the rectangular wave voltage phase control mode to the overmodulation current control mode is sometimes delayed. This delay causes hunting of current phase and unstable control. Therefore, the delay in switching-over from the rectangular wave voltage phase control mode to the overmodulation current control mode is reduced by comparing a required voltage amplitude VR taking into consideration of induced voltages and the like with the peak value of the reference triangular wave voltage and providing an offset value for preventing chattering.

According to a motor drive system disclosed in the following patent document 2, an excessive voltage is generated inside the motor drive system due to excessive regenerative electric power, when an AC motor generates excessive electric power, which exceeds a level acceptable at a DC power source side, that is, an input side. Therefore, electric power consumption of the AC motor is increased to suppress the regenerative electric power supplied to the input side. In PWM control, an optimum efficiency characteristic line, which connects maximum efficiency points in relation to current phase and output torque, is determined with respect to a current amplitude. A loss increase characteristic line is determined as a set of current operation points, which are current phase-shifted from the optimum efficiency characteristic line, so that the control is performed on the loss increase characteristic line. In a rectangular wave voltage control, a supply voltage to a motor is controlled in respect of only phase and a current phase is fixed. Therefore, a required voltage for the motor is decreased by setting the current operation point to an advanced side in a relation of a supply voltage to a motor (motor interphase voltage) and a current phase in respect of torque, so that motor current is controlled in accordance with the PWM control. Thus, motor drive efficiency is decreased while ensuring torque controllability.

According to an electric motor control system, which can stably controls a motor even in transient time of rapid changes in a command torque, rotation speed and the like, disclosed in the following patent document 3, PWM control and rectangular voltage control are switched over. The PWM wave voltage control is performed when an absolute value of a command voltage of each phase of an AC motor is less than A/2 with "A" being a value equivalent to a battery voltage. The rectangular wave voltage control is performed when the absolute value of the command voltage is between A/2 and A/2×4/π. The value of the command torque is decreased when the absolute value of the command voltage is more than a maximum voltage value.

Patent document 1: JP 2008-11682A (WO 2008/001524A1)
Patent document 2: JP 2007-151336A (EP 1950878A1)
Patent document 3: JP 2000-358393A As described above, the control mode is switched over from the rectangular wave voltage phase control mode to the overmodulation current control mode by determining the switching time point in accordance with the current phase of the actual current relative to the command current. If the switching time point is determined in the advance side in a d-q plane relative to the command current as a reference, the control chatters and current fluctuates at the time of switching over the control mode. For this reason, the switching time point is determined at a retard side in the d-q plane relative to the command current as the reference.

Because the rectangular wave includes high harmonic components, chattering is caused if the switching time point is determined in accordance with an actual current, and the current is disturbed by a step change of a voltage caused by dead-time and the like. Therefore, the switching time point is determined by using, not the actual current but a smoothed current, which is produced by filtering the actual current in an arbitrary predetermined time constant.

As a result, in a transitional state in which a command torque and a rotation speed fall rapidly, a current phase difference between the actual current and the smoothed current possibly becomes large. That is, although it is already a time point of switching over the control mode in the case of control in accordance with the instant current, it is determined to be still in a region of the rectangular wave voltage phase control mode in the case of control in accordance with the smoothed current. Thus, if the switching-over of the mode is delayed, the d-axis actual current jumps over the operation region and causes no torque generation.

For example, in the case of a rotary electric machine having salient poles and having no salient poles, the motor is operated in regions where the d-axis currents are positive and negative, respectively. No torque will be produced outside these operation regions. Therefore, when the d-axis current changes from a large negative value toward a small value in the rectangular wave voltage phase control mode in the rotary electric machine having no salient poles, the torque is not produced if the d-axis current jumps and reaches the positive region passing over the mode switching determination point.

SUMMARY OF THE INVENTION

It is therefore an object of the present invention to provide a rotary electric machine control system, which can restrict a d-axis current from deviating from an operation region at a time point of switching-over from a rectangular wave voltage phase control mode to an overmodulation current control mode.

According to one aspect of the present invention, a control system controls a rotary electric machine by switching over a control mode among a sinusoidal wave current control mode, an overmodulation current control mode and a rectangular wave voltage phase control mode. The control system switches over the control mode from the rectangular wave voltage phase control mode to the overmodulation current control mode in a stationary operation condition by using a current phase of a smoothed current produced by filtering high harmonic components of an actual current. The control system switches over the control mode from the rectangular wave voltage phase control mode to the overmodulation current control mode in a transitional operation condition by using a current phase of the actual current.

BRIEF DESCRIPTION OF THE DRAWINGS

The foregoing and other objects, features and advantages of the present invention will become more apparent from the following detailed description made with reference to the accompanying drawings. In the drawings.

DETAILED DESCRIPTION OF THE EMBODIMENT

The present invention will be described in detail with reference to one exemplary embodiment of a rotary electric machine control system, in which a rotary electric machine is mounted in a vehicle. This control system may be applied to any other rotary electric machines, which are controlled by switching over control modes among a sinusoidal wave current control mode, an overmodulation current control mode and a rectangular wave voltage phase control mode. Although this control system controls two motor-generators, each of which has a motor function and a generator function, it may control one rotary electric machine having only a motor function and one rotary electric machine having only a generator function. Further, it may control only one motor-generator or three or more motor-generators.

Although the rotary electric machine referred to below is assumed to have no salient poles in a rotor or a stator and have an operation region of a negative d-axis current, it may have salient poles. Since the rotary electric machine having salient poles operates in a region where the d-axis current is positive, switching-over from the rectangular wave voltage phase control mode to the overmodulation current control mode is performed in a region where the d-axis current is positive. For this reason, the operation of the rotary electric machine having salient poles will be understood by inverting the polarity of the d-axis current in the following description made with reference to the rotary electric machine having no salient poles. For example, although the d-axis current for mode switching-over is a negative d-axis current value, it is a positive d-axis value.

Figure 1:
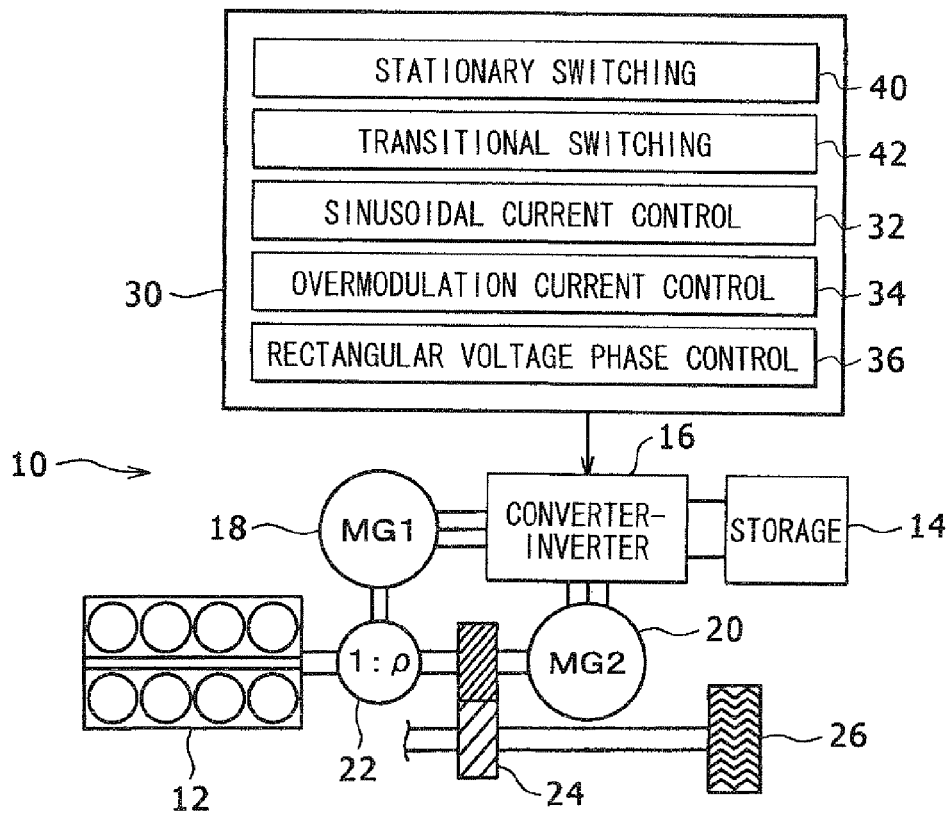
FIG. 1 is a schematic diagram showing an embodiment of a rotary electric machine control system according to the present invention.

Referring first to FIG. 1, a rotary electric machine control system 10 is provided for a rotary electric machine provided in a hybrid vehicle.

The vehicle has an engine 12 and an electric storage device (battery) 14, which are provided as drive power sources, a first rotary electric machine (MG1) 18 and a second rotary electric machine (MG2) 20. The vehicle further has an electric power circuit 16, a drive power distribution mechanism 22, a transmission 24, drive wheels (tire wheels) 26 and an electronic control unit 30. The power circuit 16 is a converter-inverter connected between the storage device 14 and the two rotary electric machines 18, 20. The power distribution mechanism 22 is for distributing driver power among the engine 12, the first rotary electric machine 18 and the second rotary electric machine 20. The transmission 24 is provided between the drive power distribution mechanism 22 and the second rotary electric machine 20. The drive wheels 26 receive drive power from the transmission 24. The control unit 30 is configured to control respective operations of these automotive parts and components.

The rotary electric machine control system 10 is primarily formed by the rotary electric machines 18, 20, the power circuit 16 and the control unit 30. The other parts and components are assembled in the similar manner as in conventional hybrid vehicles.

Each of the first rotary electric machine 18 and the second rotary electric machine 20 is a motor-generator (MG) and mounted in the vehicle. The motor-generator is a three-phase synchronous rotary machine, which operates as an electric motor when electric power is supplied from the storage device 14 and operates as an electric power generator when it is driven by the engine 12 or the vehicle is braked.

The first rotary electric machine 18 is used as the generator by being driven by the engine 12 to supply generated electric power to the storage device 14 through the converter-inverter of the power circuit 16. The second rotary electric machine 20 is used to drive the vehicle. It operates as the motor and drives the drive wheels 26 of the vehicle during a power running period by receiving electric AC power to which an electric DC power of the storage device 14 is converted by the converter-inverter of the power circuit 16. It also operates as the generator and restores regenerative energy to the storage device 14 through the converter-inverter of the power circuit 16 during a braking period of the vehicle.

The power circuit 16 is provided between the storage device 14 and the two rotary electric machines 18 and 20 as described above, and includes smoothing capacitors and the like in addition to the converter and the inverter.

The converter of the power circuit 16 is provided between the storage device 14 and the inverter and has a voltage conversion function. The converter may be configured to include a reactor and a switching element, which operates under control of the control unit 30. The voltage conversion function includes a step-up function and a step-down function. By the step-up function, a voltage at the storage device side is boosted by using the energy storing operation of the reactor function and supplied to the inverter side. By the step-down function, power from the inverter side is reduced and supplied to the storage device side as electric charge power. The converter may be referred to as a booster circuit when operating to perform the step-up function.

The inverter of the power circuit 16 is provided for converting power between AC power and DC power. The inverter includes a plurality of switching elements, which operate under control of the control unit 30. Since the first rotary electric machine 18 and the second rotary electric machine 20 are used for different purposes and operate at different operation points from each other, the inverter includes two (first and second) inverter circuits. The first inverter circuit is for the first rotary electric machine 18 and the second inverter circuit is for the second rotary electric machine 20.

When the first rotary electric machine 18 is operated as the generator, the first inverter circuit performs an AC-DC conversion function thereby to convert the AC three-phase regenerative power from the first rotary electric machine 18 to the DC power and supply the DC power as the charge current to the storage device 14. When the vehicle is in power running, the second inverter circuit for the second rotary electric machine 20 performs a DC-AC conversion function thereby to convert the DC power from the storage device 14 to the AC three-phase drive power and supply the AC drive power to the second rotary electric machine 20. When the vehicle is in braking, the second inverter circuit performs an AC-DC conversion function thereby to convert the AC three-phase regenerative power from the second rotary electric machine to the DC power and supply the DC power as the charge current to the storage device 14.

The control unit 30 is configured to perform a variety of control functions, which include, for example, control of operation of the engine 12, control of operations of the two rotary electric machines 18, 20, control of operation of the power circuit 16, control of operation of the drive power distribution mechanism 22 and control of operation of the transmission 24.

The control unit 30 is configured by a computer, for example, which is suited for mounting in the vehicle. The control operation may be performed by only one computer, or may be shared by a plurality of computers from the standpoint that the control objects are controlled at different control processing speeds. For example, the operation of the engine 12 is controlled by one computer (engine ECU), the operations of the two rotary electric machines 18, are controlled by one computer (motor-generator ECU), the operation of the power circuit 16 is controlled by one computer (power ECU), and the entire operation of the system is controlled by one computer (management ECU).

In FIG. 1, the control unit 30 is shown as being directed to perform, a rotary electric machine control function, particularly a function of suppressing a d-axis current from deviating from an operation region at the time of switching-over from the rectangular wave voltage phase control mode to the overmodulation current control mode. The control unit 30 therefore includes, for control of two rotary electric machines 18 and 20, a sinusoidal wave current control module 32 for performing sinusoidal wave current control, an overmodulation current control module 34 for performing overmodulation current control, and a rectangular wave voltage phase control module 36 for performing rectangular wave voltage phase control.

The control unit 30 further includes a stationary switching module 40 and a transitional switching module 42 for suppressing deviation of the d-axis current from the operation region when the control mode changes from the rectangular wave voltage phase control mode to the overmodulation current control mode.

The stationary switching module 40 is for switching over the control mode from the rectangular wave voltage phase control mode to the overmodulation current control mode by using the current phase of the smoothed current in the stationary operation condition. The smoothed current is produced by filtering the high harmonic components from the actual current. The transitional switching module 42 is for switching over the control mode from the rectangular wave voltage phase control mode to the overmodulation current control mode in the transitional operation condition, in which the command torque or the rotation speed falls rapidly. This switching is performed to prohibit the d-axis current from deviating from the operation region by using not the current phase of the smoothed current but the current phase of the actual current.

These functions are realized by performing software (computer programs), specifically by performing a control mode switching part in a rotary electric machine control program. These functions may be realized partly by hardware (discrete electronic circuits).

The operation of the embodiment will be described below with particular reference to the control functions of the control unit 30. It is noted that the switching-over of the control mode is described with respect to the second rotary electric machine 20 as an example, because both the first rotary electric machine 18 and the second rotary electric machine 20 are controlled in the similar manner.

First, the sinusoidal wave current control mode, overmodulation control mode and the rectangular wave voltage phase control mode are described. The sinusoidal control mode and the overmodulation current control mode are a current feedback mode, in which the second rotary electric machine 20 is controlled in a pulse-width modulation pattern determined by comparing the command voltage and the carrier wave. The rectangular control mode is a control mode, in which the one pulse switching waveform is outputted to the second rotary electric machine 20 in accordance with the electric angle while fixing the voltage amplitude to a maximum value. In this mode, torque is feedback-controlled by fixing the voltage amplitude to a maximum value and varying the phase. These three control modes are performed by the sinusoidal wave current control module 32, the overmodulation current control module 34 and the rectangular wave voltage phase control module 36, respectively.

The switching of the mode among the sinusoidal wave current control mode, the overmodulation current control mode and the rectangular wave voltage phase control mode is performed in accordance with a rate of modulation or a command voltage amplitude corresponding to the modulation rate. The modulation rate is a ratio of a signal amplitude relative to an output voltage of the inverter. In the case of pulse-width modulation (PWM) performed by the comparison of the sinusoidal wave and the triangular wave, the modulation rate is $3^{1/2}/(2 \times 2^{1/2})=0.61$. If the rectangular wave is used as the signal amplitude, the modulation rate is $6^{1/2}/\pi=0.78$.

For this reason, the rectangular wave voltage phase control, which can increase the modulation rate, is preferred so that the second rotary electric machine 20 provides higher outputs. In the sinusoidal wave current control mode and the overmodulation current control mode, a pseudo sinusoidal wave formed by PWM technology is used. As a result, the response speed can be increased to be higher than the rectangular wave voltage phase control mode. For those reasons, the sinusoidal wave current control mode, the overmodulation current control mode and the rectangular wave voltage phase control mode are preferably used in a low speed region, an intermediate speed region and a high speed region, respectively.

Figure 2:
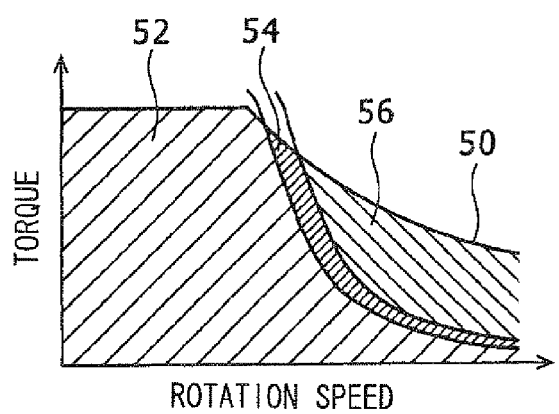
FIG. 2 is a graph showing control modes selected in accordance with operation points of the rotary electric machine.

The control modes, which are switched over in accordance with the operation point of the rotary electric machine, are shown in FIG. 2. In FIG. 2, the abscissa and the ordinate indicate the rotation speed and the torque of the rotary electric machine 20, respectively. A maximum torque characteristic is indicated by a line 50. The operation regions of the sinusoidal wave current control mode at lower speeds, the overmodulation current control mode at intermediate speeds, and the rectangular wave voltage phase control mode at higher speeds are indicated by numerals 52, 54 and 56, respectively.

Figure 3:
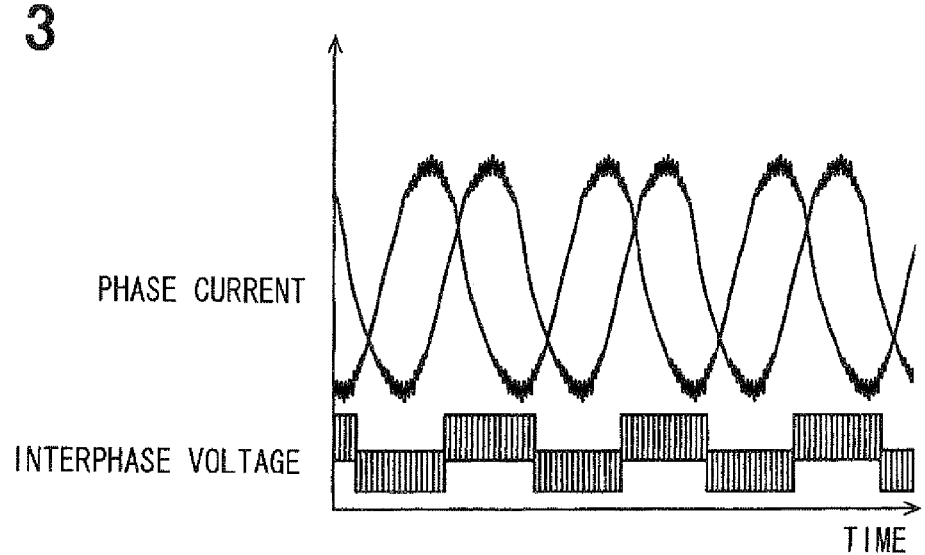
FIG. 3 is a timing diagram showing waveforms of phase currents and interphase voltages in a sinusoidal wave current control mode.
Figure 4:
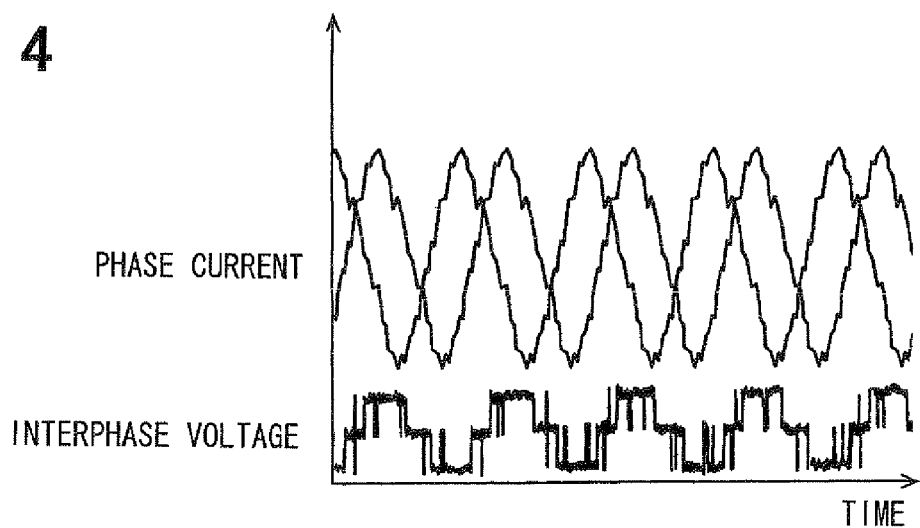
FIG. 4 is a timing diagram showing waveforms of the phase currents and the interphase voltages in an overmodulation current control mode.
Figure 5:
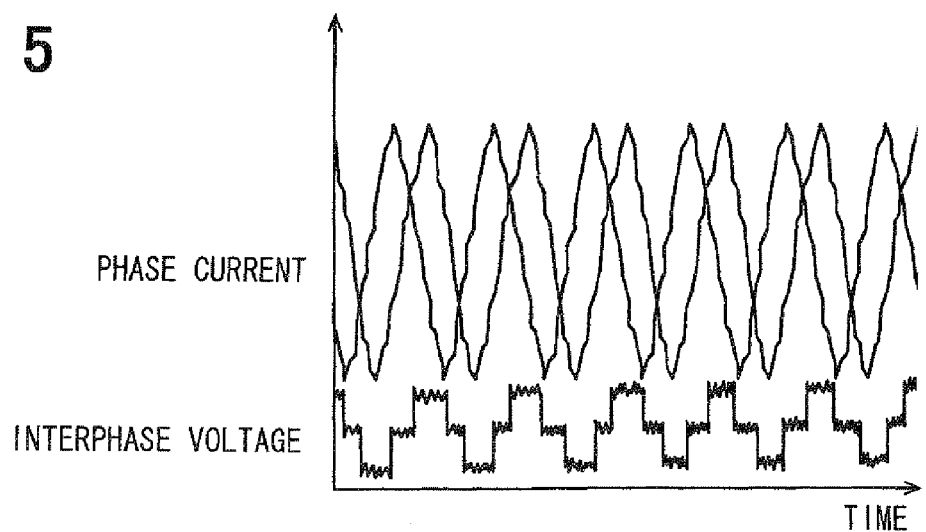
FIG. 5 is a timing diagram showing waveforms of the phase currents and the interphase voltages in a pulse voltage phase control mode.

The phase current waveform and the interphase voltage waveform in each of the sinusoidal wave current control mode, the overmodulation current control mode and the rectangular wave voltage phase control mode are shown in FIGS. 3 to 5, respectively. As shown in FIG. 3, in the sinusoidal wave current control mode, the interphase voltage waveform is a series of pulse-width modulated pulses and the phase current waveform is the pseudo sinusoidal wave formed by the PWM technology. As shown in FIG. 4, in the overmodulation current control mode, the PWM technology is used. However, the interphase voltage is overmodulated and the phase current waveform is different from that of the sinusoidal wave current control mode. As shown in FIG. 5, in the rectangular wave voltage phase control mode, the interphase voltage is a rectangular waveform, which is influenced by the voltage phase control.

The three control modes are switched over in accordance with the operation point of the rotary electric machine 20, which is determined by the rotation speed and the torque as shown in FIG. 2. As the speed and the torque are increased, the control mode is switched from the sinusoidal wave current control mode to the overmodulation current control mode and from the overmodulation current control mode to the rectangular wave voltage phase control mode. In this instance, the control mode is switched in accordance with the modulation rate. That is, the rotary electric machine 20 is controlled in the sinusoidal wave current control mode, the overmodulation current control mode and the rectangular wave voltage phase control mode, in regions where the modulation rate is less than 0.61, between 0.61 and 0.78 and more than 0.78, respectively.

The modulation rate can also be used if the control mode is switched in the opposite direction. Since the command voltage amplitude in the rectangular wave voltage phase control mode is fixed, the switching-over of the control mode from the rectangular wave voltage phase control mode to the overmodulation current control mode is performed in accordance with the phase of the actual current relative to the command current.

Figure 6:
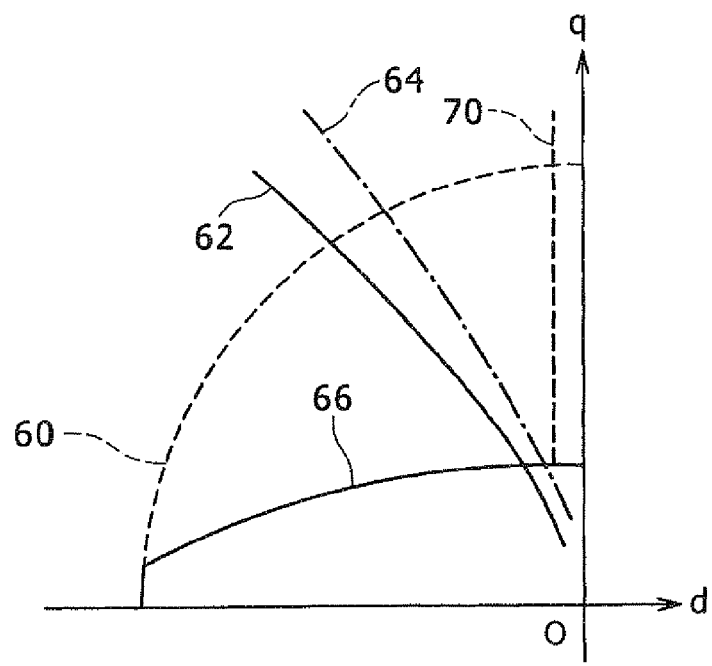
FIG. 6 is a graph showing a transitional switching reference line in the embodiment.

FIG. 6 shows a switching reference line used to determine a time point of switching over the control mode in accordance with the phase of the actual current relative to the command current. Here, as the phase of the actual current, the current phase of the actual current itself and the current phase of the smoothed current are used. The smoothed current is produced by subjecting the actual current to the processing of smoothing by filtering technology so that influence of the high frequency components in the actual current is minimized. The current phase of the smoothed current is used in determining the control mode in the stationary operation condition of the rotary electric machine 20. The current phase of the actual current itself is used to determining the control mode in the transitional operation condition, in which the command torque or the rotation speed rapidly falls.

FIG. 6 shows a d-q plane defined by a d-axis and a q-axis and used in vector control of the rotary electric machine 20. In the vector control used for the three-phase synchronous motor of a rotating field magnet type, the direction of magnetic flux formed by poles of a rotor is indicated on the d-axis and the axis orthogonal to the d-axis is on the q-axis. The d-q plane is defined as a plane, which is formed by the d-axis and the q-axis as orthogonal coordinate axes.

A rotary electric machine is expressed as follows theoretically, by using a d-axis inductance Ld, a q-axis inductance Lq, a winding resistance R, an electric angular velocity ω, a counter-electromotive force ψ, a d-axis current Id, a q-axis current Iq, a d-axis voltage Vd and a q-axis voltage Vq of the rotary electric machine.

$$Vd = R \times Id - \omega \times Lq \times Iq$$

$$Vq = R \times Iq + \omega \times Ld \times Id + \omega \times \psi$$

Further, torque T is expressed as follows by assuming that the number of poles of the rotary electric machine is p.

$$T = p \times \psi \times Iq + p \times (Ld - Lq) \times Id \times Iq$$

It is assumed that an absolute value Ia of a current vector, which is defined by the d-axis current Id and the q-axis current Iq, and a current phase β are expressed as follows.

$$Ia = (Id^2 + Iq^2)^{1/2}$$

$$\beta = \tan^{-1}(Iq/Id)$$

Then, the torque T is expressed as follows.

$$T = p \times \psi \times Ia \times \sin \beta + (1/2) \times p \times (Ld - Lq) \times Ia^2 \times \sin 2\beta$$

It is understood from this expression that the torque T is controllable by the current phase β. That is, the current phase indicates a phase between a d-axis current component and a q-axis current component in the current.

Thus, the torque of the rotary electric machine 20 can be controlled by controlling the current phase β. The current phase β that provides a maximum torque can be determined by differentiating the equation of the torque T by the current phase β and applying zero thereto. That is, the current phase β at the maximum torque is expressed as follows.

$$\beta = \cos^{-1}[[-\psi + \{\psi^2 - 8 \times (Ld-Lq)^2\}^{1/2}]/4 \times (Ld-Lq) \times Ia]$$

The characteristic line, which enables the rotary electric machine 20 to be driven at the maximum efficiency, can be determined by adding certain appropriate corrections to the equation determined as above.

In FIG. 6, a characteristic line 62 indicates a maximum efficiency line determined as above. The rotary electric machine 20 can be driven at the maximum efficiency by performing the current command, that is, by determining the command current, on the maximum efficiency characteristic line 62. The command current determined in correspondence to the maximum efficiency characteristic line 62 is referred to simply as the command current.

The maximum efficiency characteristic line 62 is the characteristic line, which is determined by connecting current pairs of the d-axis current and the q-axis current each satisfying the current phase β at the maximum torque. A voltage command characteristic fine 66 is shown as a characteristic line, which is determined by connecting voltage pairs of a d-axis voltage and a q-axis voltage corresponding to the d-axis current and the q-axis current of the characteristic line 62.

A maximum voltage supplied to the rotary electric machine 20 is shown by a maximum voltage characteristic line (circle) 60. In the rectangular wave voltage phase control mode, the magnitude of the torque produced can be controlled by controlling the voltage phase on the maximum voltage circuit 60 when the voltage amplitude is fixed. Therefore, the voltage command characteristic line 66 inside the maximum voltage circle 60 indicates the voltage pair of the d-axis voltage and the q-axis voltage of the command voltage at the maximum efficiency drive operation in the sinusoidal wave current control mode and the overmodulation current control mode.

By thus using the d-q plane, the maximum efficiency characteristic line 62 and the voltage command characteristic line 66 are shown as indicating the command current for the maximum efficiency drive operation in the sinusoidal wave current control mode and the overmodulation current control mode and indicating the command voltage corresponding to such a command current, respectively. The command voltage in the rectangular wave voltage phase control mode is shown by the maximum voltage circle 60.

The current command performed on the maximum efficiency characteristic line 62 is performed in accordance with the current phase. The voltage command performed on the maximum voltage circle 60 is performed in accordance with the voltage phase. Thus, in driving the rotary electric machine 20, the switching-over of the control mode is performed while monitoring the current phase and the voltage phase. The higher frequency components included in the actual current are likely to cause chattering and the like in switching over the control mode. To counter this problem, the switching-over of the control mode is determined not based on the actual current but based on the smoothed current produced by filter-processing the actual current by a predetermined time constant.

In FIG. 6, a switching reference line 64 is a characteristic line, which is retarded from the maximum efficiency characteristic line 62 by a predetermined phase difference on the d-q plane. That is, the switching reference line 64 has the predetermined phase difference in the delayed angle side. The switching reference line 64 is used as a reference in determining the switching-over from the rectangular wave voltage phase control mode to the overmodulation current control mode. The switching reference line 64 is provided at the retarded side from the maximum efficiency characteristic line 62, because the chattering will be caused at the time of switching over the control mode if the control mode is switched over at the advanced angle side.

The switching-over based on the switching reference line 64 is determined when the rotary electric machine 20 is in the stationary operation condition. It is performed based on the smoothed current while referring to the current phase and the like. This switching reference line 64 is referred to as a stationary switching reference line thereby to differentiate from a switching reference line used for the actual current.

As described above, the torque T of the rotary electric machine 20 is expressed as follows.

$$T = p \times \psi \times Iq + p \times (Ld-Lq) \times Id \times Iq$$

Ld and Lq are positive values and fixed, once the specification of the rotary electric machine 20 is determined.

Here, it is assumed that the torque T is positive with the q-axis current Iq being positive. If the rotor or the stator of the rotary electric machine 20 has salient poles, the operation region is where the inductance difference (Ld−Lq) is positive and the d-axis current Id is positive. If the second rotary electric machine 20 has no salient poles, the operation region is where Id is negative because (Ld−Lq) is negative. Since the rotary electric machine 20 has no salient poles, the operation region is where Id is negative. FIG. 6 shows this region.

Therefore, if the control mode is switched over based on the switching reference line 64 by using the smoothed current when the difference in the current phases of the actual current and the smoothed current is large, the actual current, which is the instantaneous current, is likely to become negative crossing the d-axis. That is, it may arise that, although the control mode should be switched over according to the actual current, it is determined to be still in the rectangular wave voltage phase control mode according to the smoothed current. If the switching over the control mode is thus delayed, the inductance difference (Ld−Lq) becomes negative and the d-axis current Id becomes positive in the expression of the torque T. This means that the torque decreases rapidly and missing torque is caused.

To counter this problem, a transitional switching reference line 70 is provided as a switching determination line for the actual current as shown in FIG. 6. The transitional switching reference line 70 is a straight line, which is set to have a predetermined switching d-axis current value in the same polarity as the d-axis current of the command current of the second rotary electric machine 20 on the d-q plane. The transitional switching reference line 70 is set at the retarded side from the switching reference line 64 but at the advanced side from the q-axis and extend in parallel to the q-axis. As a result, the control mode is switched over when the d-axis current value of the actual current crosses the transitional switching reference line 70.

Figure 7:
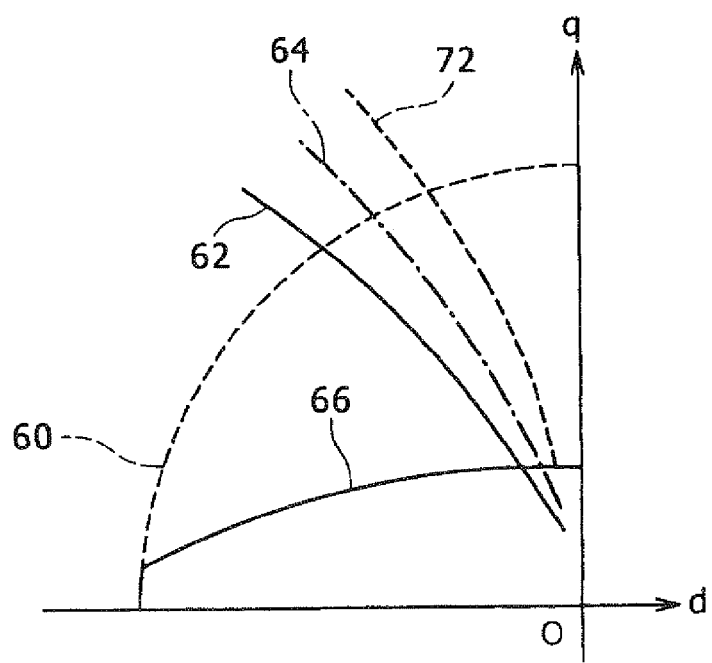
FIG. 7 is a graph showing a transitional switching reference line in the embodiment.

A transitional switching reference line 72 is shown in FIG. 7 as another example of the switching determination line for the actual current. The transitional switching reference line 72 is a curve, which has a current phase difference larger than the stationary switching current phase difference relative to the current phase of the command current of the second rotary electric machine 20 on the d-q plane. This line 72 is at the more advanced side and more away from the q-axis than the reference line 70 shown in FIG. 6. Thus, the transitional switching reference line 72 is set between the switching reference line 64 and the q-axis and has a constant current phase difference relative to the switching reference line 64 at the retard angle side. The control mode is switched over when the d-axis current value of the actual current crosses the transitional switching reference line 72.

The transitional switching reference line 70 or the transitional switching reference line 72 set between the switching reference line 64 and the q-axis is used for switching the control mode by using the actual current in the transitional operation condition, in which the command torque or the rotation speed fall rapidly. For this reason, this line is referred to as the transitional switching reference line to differentiate form the stationary switching reference line 64.

Figure 8:
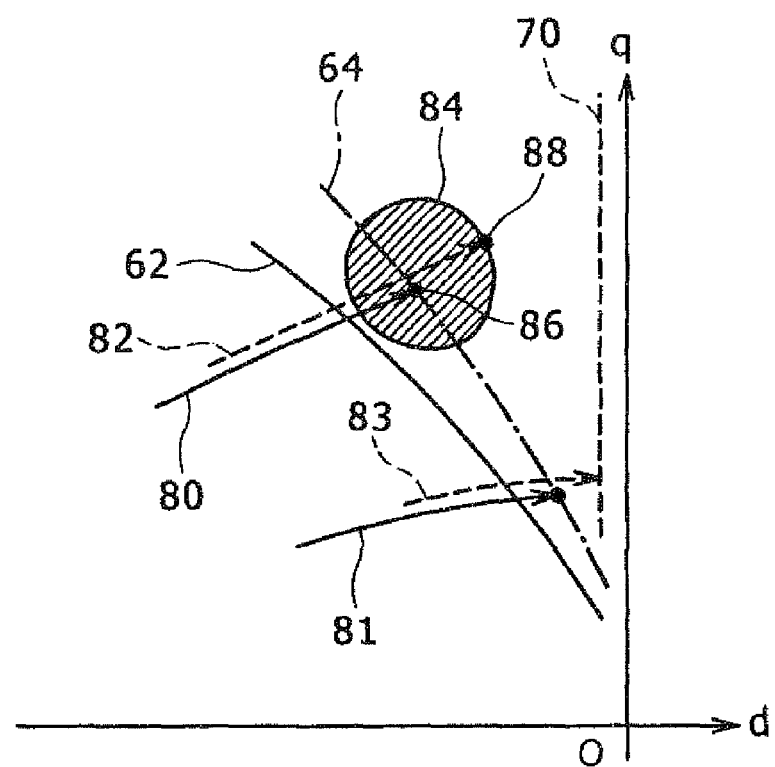
FIG. 8 is a graph schematically showing a function of the transitional switching reference line as an example of a transitional switching reference line in the embodiment.

The transitional switching reference line 70 is determined exemplarily as shown in FIG. 8. For example, the voltage phase is changed to the retard angle side on the d-q plane, if the torque is reduced in the rectangular wave voltage phase control mode. It is checked whether the smoothed current changes crossing the switching reference line 64, thereby to determine the time point to switch over the control mode to the overmodulation current control mode. A trajectory 80 of the current phase of the smoothed current is shown by a solid line 80 in FIG. 8. Since the smoothed current is produced by filtering out the high frequency components from the actual current by a predetermined time constant, the smoothed current resultantly has a certain phase difference. The magnitude of this difference is shown as a detection error range 84 in FIG. 8. Therefore, when it is detected that the current phase trajectory 80 of the smoothed current has reached the switching reference line 64, a current phase trajectory 82 of the actual current is generated at the further retarded angle side. That is, it reaches a point 88 crossing the switching reference line 64 in the positive direction of the d-axis.

In this example, the point 88, which the current phase trajectory 82 reaches when the current phase trajectory 80 of the smoothed current 80 reaches the switching reference line 64 is still in the negative range of the d-axis. Another current phase trajectory 81 of the smoothed current is shown in FIG. 8. In this case, a current phase trajectory 83 of the actual current is already very close to the q-axis, when a current phase trajectory 81 reaches the switching reference line 64. It may arise that the d-axis current will enters the positive range crossing the q-axis.

Since the second rotary electric machine 20 has no salient poles, it operates in the region where the d-axis current is negative. If the d-axis current becomes positive, the torque will be reduced rapidly and missing torque is caused. To avoid this missing torque, the transitional switching reference line 70 is set at the advanced side from the q-axis and it is checked whether the current phase of the actual current crosses the transitional switching reference line 70. When it is detected that the current phase of the actual current crosses the transitional switching reference line 70, the control mode is switched from the rectangular wave voltage phase control mode to the overmodulation current control mode whether the current phase of the smoothed current crosses the switching reference line 64 or not. Thus, the current phase of the actual current is prevented from crossing the q-axis to the positive side of the d-axis. As a result, occurrence of missing torque is prevented.

By thus using the transitional switching reference line 70, the current phase of the actual current is prevented from changing to the positive side of the d-axis. In comparison to the transitional switching reference line 72 shown in FIG. 7, the transitional switching reference line 70 is so set that its switching d-axis current value is fixed to the predetermined constant value, computer processing such as checking and determination processing is simplified and the second rotary electric machine 20 can be operated in the rectangular wave voltage phase control mode in a wider region. According to the transitional switching reference line 72 in FIG. 7, the switching reference current value is defined by a curve. As a result, it is advantageous in that the polarity of the d-axis current of the actual current can be prevented from changing. Further, the control stability can be enhanced because the difference between the command current and the actual current is reduced.

Figure 9A:
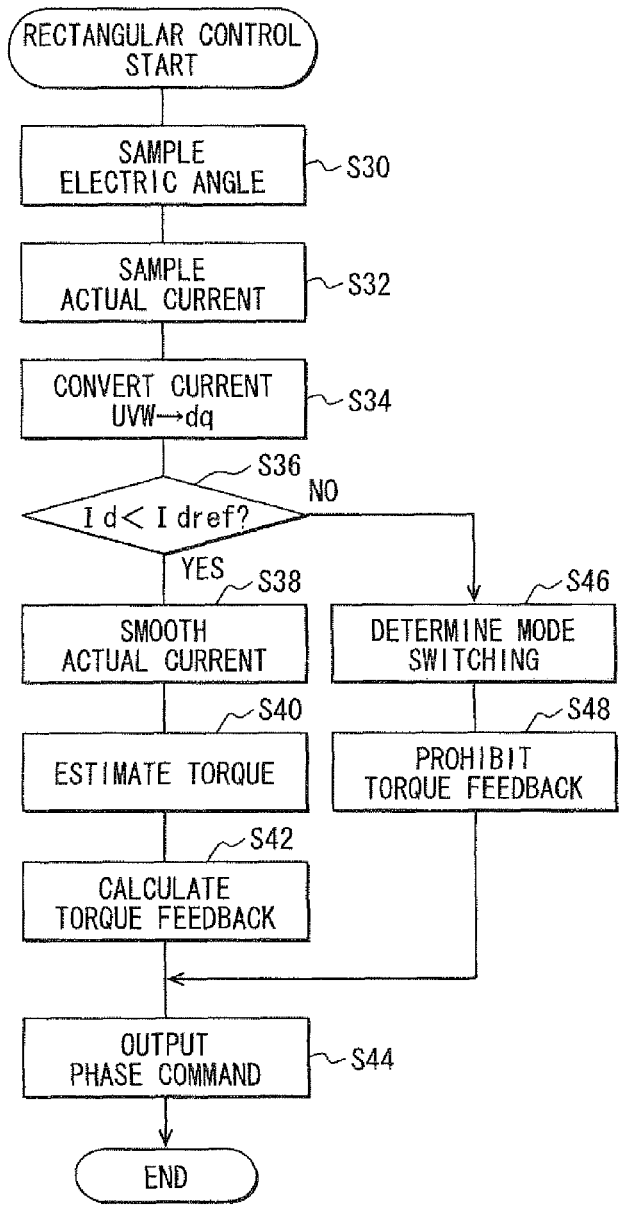
FIGS. 9A and 9B are flowcharts showing control processing in the embodiment.
Figure 9B:
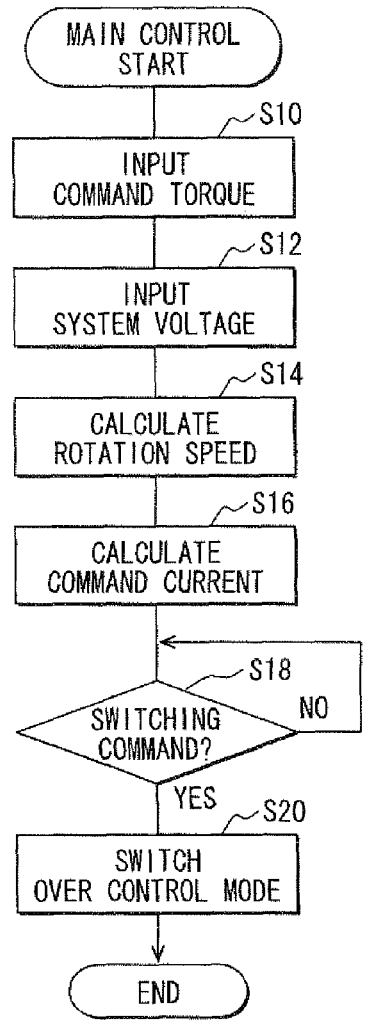

The foregoing switching control is performed by the control unit 30 by executing the control processing shown in FIGS. 9A and 9B. The control processing is shown as being separated into rectangular wave control processing (FIG. 9A) and main control processing (FIG. 9B). The main control processing is for calculating the command currents and the like, which are common among all control modes of the rotary electric machine including the sinusoildal control mode, the overmodulation current control mode and the rectangular control mode. The main control is executed at a main interval which is relatively long, that is, at slow processing speed. The rectangular wave control processing is for controlling the operation from time to time in the rectangular wave voltage phase control mode and hence executed at an interval, which is much shorter than that of the main control, that is, at much higher processing speed than that of the main control.

In the main control processing, a command torque is inputted based on a torque required by an accelerator or the like of the vehicle (S10), and a system voltage is inputted to set a system voltage corresponding to the inputted command torque (S12). The system voltage is a voltage supplied between the positive bus and the negative bus of the inverter. The maximum voltage circle of the second rotary electric machine 20 is defined based on this system voltage. The rotation speed of the rotary electric machine 20 is calculated (S14) and the command current is calculated (S16). It is checked whether the switching command is received from the rectangular wave voltage phase control mode processing (S18). If the switching command is received (YES at S18), the control mode is switched over (S20).

In the rectangular wave control processing, an electric angle of the rotary electric machine 20 is detected by sampling, for example, by a resolver provided in the rotary electric machine 20 (S30), and the current of each phase (U, V and W) of the rotary electric machine 20 is detected by sampling (S32). This sampled each phase current is the actual current sampled instantaneously. The each phase current is converted into the d-axis current and the q-axis current (S34). The converted d-axis current is also the actual current. The d-axis current converted from the actual current detected by sampling and a switching determination reference current Idref defined by the transitional switching reference line are compared (S36). When the transitional switching reference line 70 is used, the reference current Idref corresponds to its switching d-axis current value. When the transitional switching reference line 72 is used, the reference current Idref corresponds to its switching d-axis current value.

If the d-axis current Id is less than the switching determination reference current Idref (YES at S36), that is, the actual current does not reach the transitional switching reference line, the d-axis current and the q-axis current are smoothed by filtering (S38). Then, the torque in the stationary operation condition is estimated based on the smoothed current (S40). A difference between the estimated torque and the command torque inputted at S10 is calculated, and a torque feedback amount is calculated based on the calculated torque difference to reduce such a torque difference (S42). The command voltage phase is outputted in correspondence to the feedback amount (S44). The current phase corresponds to the outputted command voltage phase.

If the d-axis current Id is not less than the switching determination reference current Idref (NO at S36), the actual current has reached the transitional switching reference line or is varying in the positive side of the d-axis. Therefore, the switching-over of the control mode is determined by the use of the transitional switching reference line (S46). Thus, if the Id is equal to or greater than Idref (NO at S36), the rotary electric machine 20 is determined to be in the transitional operation condition and the control mode is immediately switched from the rectangular wave voltage phase control mode to the overmodulation current control mode.

This function is performed by the transitional switching module 42 of the control unit 30 shown in FIG. 1. Each of the rectangular wave voltage phase control processing is performed by the rectangular wave voltage phase control module 36. The determination of the control mode switching at S46 is referred to at S18 in the main control processing (FIG. 9B). Checking of the control mode at S18 is performed by the stationary switching module 40 of the control unit 30.

The determination of the control mode switching in the transitional operation condition is performed in the rectangular wave voltage phase control processing, which is executed at the shorter interval than the normal interval of execution of the main control processing. The result of the determination of the control mode switching is received in the course of execution of the main control processing, and the control mode is switched over in the stationary operation condition under the relatively slow serial data processing of the computer.

When the switching of the control mode from the rectangular control mode to the overmodulation current control mode is determined at S46, the torque feedback calculation is prohibited temporarily (S48). Thus, the voltage phase is fixed temporarily, so that the voltage phase is prevented from being advanced too much with the continuation of the torque feedback. The torque feedback calculation is continuously prohibited until the d-axis current Id becomes less than the reference current Idref.

Figure 10:
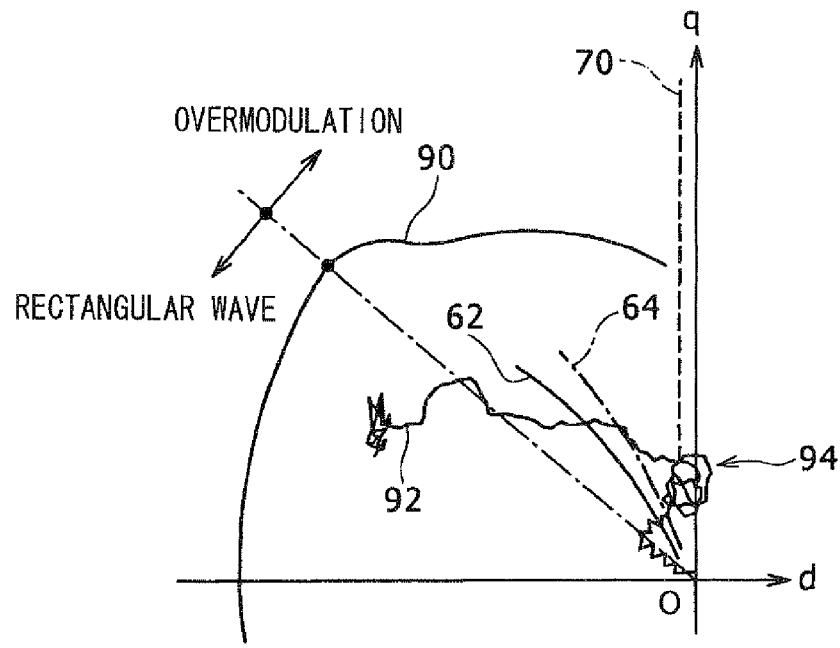
FIG. 10 is a graph showing trajectories of an actual current phase and the like when the control mode is switched over by comparison with the current phase of the actual current by using the transitional switching reference line in the embodiment.
Figure 11:
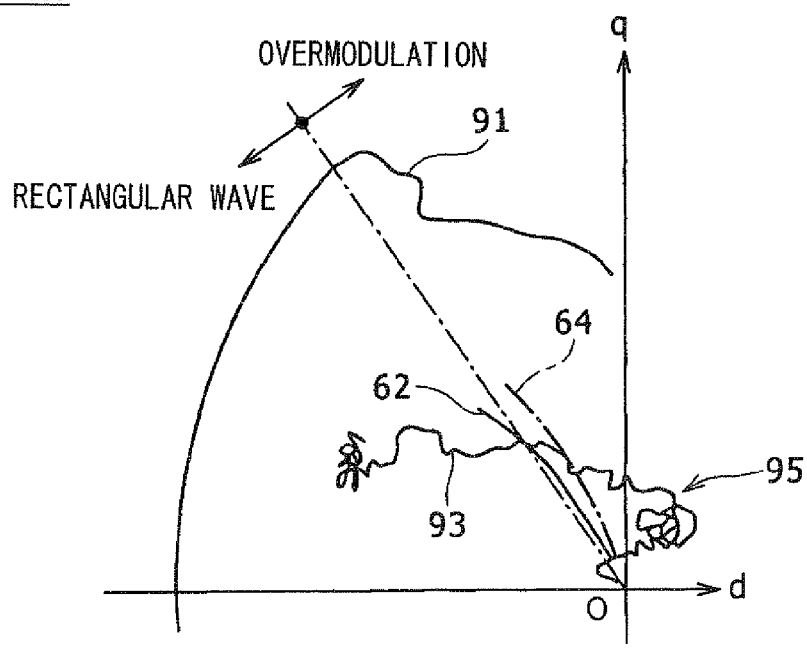
FIG. 11 is a graph showing trajectories of the current phase and the like when the control mode is switched over by comparison with a current phase of a smoothed current by using a switching reference line according to conventional technology.

FIGS. 10 and 11 show operations of the embodiment and the prior art, respectively. These figures show trajectories of the actual voltage phase and the actual current phase on the d-q plane shown in FIGS. 6 and 7.

As shown in FIG. 10, if the control mode switching is performed by using the transitional switching reference line 70 and comparing with the current phase of the actual current, a trajectory 90 of the actual voltage phase changes relatively smoothly before and after the switching-over of the control mode. A trajectory 92 of the actual current phase also changes relatively stably after crossing the switching reference line 64. The period, in which the polarity of the d-axis current is reversed to positive, is shortened to be a minimum.

If the control mode switching is performed by comparing the current phase of the smoothed current with the switching reference line 64 as in the prior art, a trajectory 91 of the actual voltage phase changes greatly immediately after the switching of the control mode as shown in FIG. 11. A trajectory of the current phase 93 also changes considerably after crossing the switching reference line 64 as indicated by 95. As a result, the period, in which the polarity of the d-axis current is reversed to the positive, becomes considerably long.

According to the embodiment described above, the control mode is switched over from the rectangular wave voltage phase control mode to the overmodulation current control mode by using the transitional switching reference line, when the current phase of the actual current crosses this reference line in the transitional operation condition. As a result, the d-axis current is suppressed from deviating from the operation region and missing of torque is suppressed.

What is claimed is:

1. A control system for controlling a rotary electric machine by switching over a control mode among a sinusoidal wave current control mode, an overmodulation current control mode and a rectangular wave voltage phase control mode, the control system comprising:
   a stationary switching unit configured to switch over the control mode from the rectangular wave voltage phase control mode to the overmodulation current control mode in a stationary operation condition by using a current phase of a smoothed current produced by filtering high harmonic components of an actual current; and
   a transitional switching unit configured to switch over the control mode from the rectangular wave voltage phase control mode to the overmodulation current control mode in a transitional operation condition by using a current phase of the actual current; wherein:
   the stationary switching unit switches over the control mode when the current phase of the smoothed current crosses a stationary switching reference line, which is determined to have a predetermined stationary switching phase difference relative to a current phase of a command current of the rotary electric machine on a d-q plane formed of a d-axis and a q-axis crossing orthogonally; and
   the transitional switching unit switches over the control mode when a d-axis current value of the actual current crosses a transitional switching reference line, which is determined to have a predetermined switching d-axis current value in a same polarity as a d-axis current value of a command current of the rotary electric machine on the d-q plane.

2. A control system for controlling a rotary electric machine by switching over a control mode among a sinusoidal wave current control mode, an overmodulation current control mode and a rectangular wave voltage phase control mode, the control system comprising:
   a stationary switching unit configured to switch over the control mode from the rectangular wave voltage phase control mode to the overmodulation current control mode in a stationary operation condition by using a current phase of a smoothed current produced by filtering high harmonic components of an actual current; and a transitional switching unit configured to switch over the control mode from the rectangular wave voltage phase control mode to the overmodulation current control mode in a transitional operation condition by using a current phase of the actual current; wherein:

the stationary switching unit switches over the control mode when the current phase of the smoothed current crosses a stationary switching reference line, which is determined to have a predetermined stationary switching phase difference relative to a current phase of a command current of the rotary electric machine on a d-q plane formed of a d-axis and a q-axis crossing orthogonally; and the transitional switching unit switches over the control mode when an current phase of the actual current crosses a transitional switching reference line, which is determined to have a current phase difference in advance of the q-axis and larger than that of a stationary switching current phase difference relative to a command current of the rotary electric machine on the d-q plane.

3. A control system for controlling a rotary electric machine by switching over a control mode among a sinusoidal wave current control mode, an overmodulation current control mode and a rectangular wave voltage phase control mode, the control system comprising:

a stationary switching unit configured to switch over the control mode from the rectangular wave voltage phase control mode to the overmodulation current control mode in a stationary operation condition by using a current phase of a smoothed current produced by filtering high harmonic components of an actual current; and a transitional switching unit configured to switch over the control mode from the rectangular wave voltage phase control mode to the overmodulation current control mode in a transitional operation condition by using a current phase of the actual current; and a voltage phase fixing unit for fixing a voltage phase by stopping torque feedback in the rectangular wave voltage phase control mode, when the transitional switching unit switches over the control mode.

* * * * *